United States Patent
Qi et al.

(10) Patent No.: US 8,021,795 B2
(45) Date of Patent: Sep. 20, 2011

(54) METHOD FOR MANUFACTURING SOLID OXIDE ELECTROCHEMICAL DEVICES

(75) Inventors: Xiwang Qi, Scottsdale, AZ (US); Rong Fan, Rancho Palos Verdes, CA (US); Andrew Philip Shapiro, Schenectady, NY (US); Dacong Weng, Rancho Palos Verdes, CA (US); Jie Guan, Torrance, CA (US); James Daniel Power, Santa Monica, CA (US); Stanley F. Simpson, Rancho Paolo Verdes, CA (US)

(73) Assignee: General Electric Company, Schenectady, NY (US)

( * ) Notice: Subject to any disclaimer, the term of this patent is extended or adjusted under 35 U.S.C. 154(b) by 1366 days.

(21) Appl. No.: 11/307,265

(22) Filed: Jan. 30, 2006

(65) Prior Publication Data

US 2006/0257703 A1    Nov. 16, 2006

Related U.S. Application Data

(63) Continuation-in-part of application No. 11/101,697, filed on Apr. 7, 2005, now abandoned.

(51) Int. Cl.
*H01M 8/12* (2006.01)

(52) U.S. Cl. ........ 429/467; 429/468; 429/469; 429/479; 429/488

(58) Field of Classification Search ............ 429/12, 429/467, 479, 488, 468, 469
See application file for complete search history.

(56) References Cited

U.S. PATENT DOCUMENTS

| | | | |
|---|---|---|---|
| 5,290,642 A * | 3/1994 | Minh et al. | 429/33 |
| 5,770,327 A | 6/1998 | Barnett et al. | |
| 6,426,159 B1 | 7/2002 | Kralick | |
| 2002/0064703 A1 | 5/2002 | Mizuno | |
| 2002/0164514 A1 | 11/2002 | Kelley et al. | |
| 2002/0182471 A1 | 12/2002 | Kralick | |
| 2003/0235744 A1 | 12/2003 | Pflaesterer | |
| 2003/0235745 A1 | 12/2003 | Mook et al. | |
| 2004/0101742 A1 * | 5/2004 | Simpkins et al. | 429/44 |

* cited by examiner

*Primary Examiner* — Jane Rhee
(74) *Attorney, Agent, or Firm* — Sutherland Asbill & Brennan LLP

(57) ABSTRACT

A method for manufacturing a solid oxide electrochemical device comprising disposing electrolyte between a first electrode and a second electrode, applying a bonding agent between the first electrode and a first interconnect, applying a sealing agent between the first electrode and the first interconnect, disposing a second interconnect adjacent to the second electrode, heating the first interconnect, the first electrode, the electrolyte, the second electrode, the second interconnect, the bonding agent, and the sealing agent to at least one intermediate temperature for at least one intermediate length of time, and then to a curing temperature, for a curing time, effective to bond and seal the first electrode to the first interconnect, wherein the at least one intermediate temperature is less than the curing temperature.

20 Claims, 4 Drawing Sheets

METHOD FOR MANUFACTURING SOLID OXIDE ELECTROCHEMICAL DEVICES

CROSS-REFERENCE TO RELATED APPLICATIONS

The application is a continuation in part of U.S. patent application Ser. No. 11/101,697, filed Apr. 7, 2005 now abandoned.

TECHNICAL FIELD

This invention relates to solid oxide electrochemical devices, and more particularly, to sealing processes for fabricating solid oxide electrochemical devices.

BACKGROUND OF THE INVENTION

Solid oxide electrochemical devices have demonstrated great potential for future power generation with high efficiency and low emission. Such solid oxide electrochemical devices include solid oxide fuel cells (SOFCs) and solid oxide electrolyzers.

Solid oxide fuel cells produce electricity by oxidizing fuel on one electrode (anode) and reducing oxygen on the other electrode (cathode). The electrodes are separated by an electrolyte that conducts electricity by the migration of ions. Under the appropriate conditions the reduction/oxidation reactions on the electrodes produce a voltage, which can then be used to generate a flow of direct current. In the case of a solid oxide fuel cell operating with hydrogen fuel and air as an oxidant, oxygen ions are conducted through the electrolyte where they combine with the hydrogen to form water as an exhaust product. The electrolyte is otherwise impermeable to both fuel and oxidant and merely conducts oxygen ions. This series of electrochemical reactions is the sole means of generating electric power within the solid oxide fuel cells. It is therefore desirable to reduce or eliminate any reactant mixing that results in a different reaction, such as combustion, which does not produce electric power and therefore reduces the efficiency of the solid oxide fuel cell.

Solid oxide electrochemical devices are typically assembled in electrical series in a solid oxide electrochemical device stack to produce power in useful amounts. To create a solid oxide electrochemical device stack, an interconnecting member, referred to as an interconnect, is used to connect the adjacent solid oxide electrochemical devices together in electrical series. Typically, an anode layer is connected to an anode interconnect and a cathode layer is connected to a cathode interconnect. When the solid oxide electrochemical devices are operated at high temperatures, such as between approximately 600° C. and 1000° C., the solid oxide electrochemical devices are subjected to mechanical and thermal loads that may create strain and resulting stress in the solid oxide electrochemical device stack.

Typically, high temperature solid oxide electrochemical devices are made of ceramics, which must be sealed to the metallic interconnect structure in order to define closed passages for the reactants, namely the fuel and the oxidant, to flow to and from the solid oxide electrochemical device. During thermal cycles, various components of the solid oxide electrochemical device stack expand and/or contract in different ways due to the difference in the coefficient of thermal expansion of the materials of construction. In addition, individual components may undergo expansion or contraction due to other phenomena, such as a change in the chemical state of one or more components. This difference in dimensional expansion and/or contraction may affect the seal separating the oxidant and the fuel paths and also the sealing of the elements made of dissimilar materials.

Conventionally, a typical anode layer of a solid oxide electrochemical device is made of a nickel based cermet, which itself is made by chemical reduction of nickel oxide in mixture with a ceramic. A major problem in solid oxide electrochemical device stack design is that the high temperature typically requires that the seals be made of brittle materials such as glass and glass ceramics. Prior to operation, the nickel oxide in the anode of the solid oxide electrochemical device is reduced to nickel at high temperature, and this chemical reduction causes a physical reduction of volume of the anode. This reduction in the volume of the anode layer can place additional stress on links between the solid oxide electrochemical device and other components, such as the seal, and can cause the seal of the solid oxide electrochemical device assembly or the solid oxide electrochemical device itself to fail. This stress is aggravated by the stresses arising from different coefficients of thermal expansion of the ceramic and metal, thereby causing the unequal physical reduction of volume of the anode layer and the interconnect in contact with the anode layer. Another consequence of the differential thermal and chemical expansions of the solid oxide electrochemical device and the interconnect is the potential loss of mechanical contact between the anode layer or cathode layer and its corresponding interconnect (the anode interconnect or the cathode interconnect).

In addition, conventional processing of multiple solid oxide electrochemical assemblies in a solid oxide electrochemical stack has relied upon sealing all or several of the solid oxide electrochemical assemblies and interconnects in a single process to form an integral, inseparable stack. If, following such assembly and processing, a defect is identified in any seal, the solid oxide electrochemical device stack cannot be disassembled without destroying the seals. Thus, any defect in one solid oxide electrochemical device assembly could render the entire solid oxide electrochemical device stack unusable.

A common approach to the thermal stress problem is to find a combination of ceramic and metal where the coefficients of thermal expansion match closely enough that stresses are minimized. However, it is very difficult to match the coefficients over the entire temperature range. Moreover, even such matching does not avoid stresses due to the reduction in volume of the anode layer in its pre-operation transition from a ceramic and nickel oxide mixture to a nickel based cermet. Also, the materials chosen based upon a close thermal match may not be optimal for the performance of the solid oxide electrochemical device.

Accordingly, there is a need for a simple and economically desirable design of a solid oxide electrochemical device stack and a method for making a solid oxide electrochemical device that avoids the above-described stresses and defects.

SUMMARY OF THE INVENTION

This invention addresses the above described need in the art by providing a method for manufacturing a solid oxide electrochemical device comprising disposing electrolyte between a first electrode and a second electrode, applying a bonding agent between the first electrode and a first interconnect so that the bonding agent is in contact with the first electrode and the first interconnect, wherein the first electrode and the first interconnect are configured to form at least one flowfield between each other, applying a sealing agent between the first electrode and the first interconnect, disposing a second interconnect adjacent to the second electrode, heating the first interconnect, the first electrode, the electrolyte, the second electrode, the second interconnect, the bonding agent, and the sealing agent to at least one intermediate temperature for at least one intermediate length of time, and then to a curing temperature, for a curing time, effective to bond and seal the first electrode to the first interconnect, wherein the at least one intermediate temperature is less than the curing temperature.

In addition, this invention encompasses a solid oxide electrochemical device manufactured by the above-described method.

Other objects, features, and advantages of this invention will be apparent from the following detailed description, drawings, and claims.

DETAILED DESCRIPTION OF EMBODIMENTS

Figure 1:
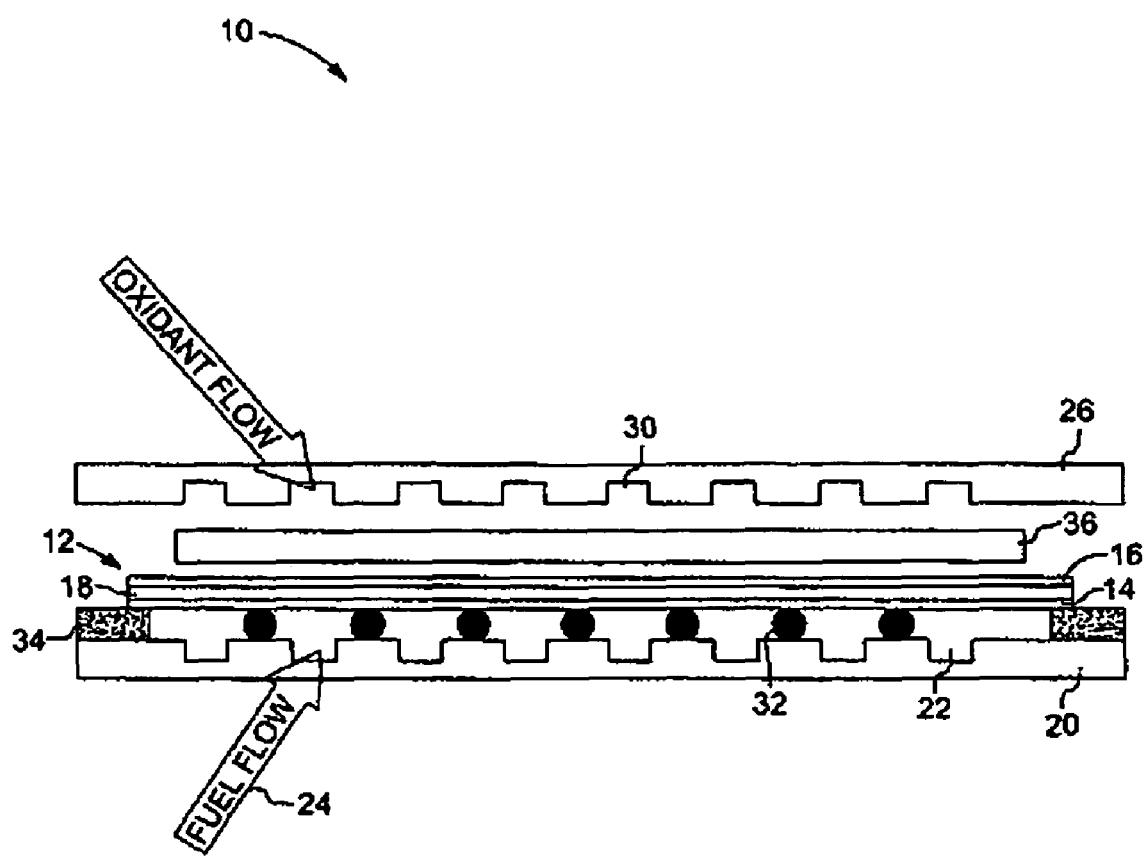
FIG. 1 is a schematic illustration of a solid oxide electrochemical device assembly made in accordance with an embodiment of the present invention.

As summarized above, this invention encompasses a method for manufacturing a solid oxide electrochemical device and a solid oxide electrochemical device manufactured by such a method. Embodiments of this invention are described in detail below and illustrated in FIGS. 1-4. FIG. 1 illustrates a solid oxide electrochemical device assembly 10 made in accordance with an embodiment of the present invention. More particularly, the solid oxide electrochemical device assembly 10 in FIG. 1 is a SOFC, but it should be understood that this invention also encompasses solid oxide electrolyzers. The solid oxide electrochemical device assembly 10 comprises a solid oxide electrochemical device 12 comprising a first electrode 14, a second electrode 16, and an electrolyte 18 interposed between the first electrode and the second electrode. The electrolyte 18 can comprise yttrium stabilized zirconia (YSZ), for example. The first electrode 14 is an anode layer and the second electrode 16 is a cathode layer.

The solid oxide electrochemical device assembly 10 also comprises a first interconnect 20 having a plurality of flow channels 22 (also called "flowfields"). The solid oxide electrochemical device assembly 10 further comprises a second interconnect 26 having a plurality of flow channels 30. The first interconnect 20 is an anode interconnect and is configured to be bonded with the anode layer 14. The anode interconnect 20 can comprise any suitable material, such as electrically conductive materials, including stainless steel, nickel, nickel alloys, fecralloy, nichrome, gold, silver, platinum, palladium, ruthenium, or rhodium or heat resistant metals and alloys such as, Inconel® (a nickel-based alloy with chromium and iron from Special Metals Welding Products, Newton, N.C.), E-Brite® (a ferric stainless steel from Allegheny Ludlum Industries, Inc., Pittsburgh, Pa.), and Crofer22 APU (iron-chromium alloy from ThyssenKrupp, Düsseldorf, Germany), for example. Likewise, the second interconnect 26 is a cathode interconnect and is configured to be bonded with the cathode layer 16. The cathode interconnect 26 may comprise an electrically conductive material, such as stainless steel, fecralloy, nichrome, gold, silver, platinum, palladium, ruthenium, rhodium, Inconel®, E-Brite®, Crofer22 APU, or combinations thereof. More generally, the anode interconnect 20 and the cathode interconnect 26 can be fabricated from any electrically conductive material capable of operating at the elevated temperatures and in the atmospheres experienced by the solid oxide electrochemical device assembly 10 during operation.

The anode interconnect 20 is configured to introduce a reducing agent 24 (also referred as a fuel gas) to the anode layer 14 through the flow channels 22. Correspondingly, the cathode interconnect 26 is configured to introduce an oxidant to the cathode layer 16 through the flow channels 30. In addition, the interconnects 20 and 26 provide electrical contact between solid oxide electrochemical devices connected in series or in parallel, and provide structural support.

During operation of solid oxide electrochemical device assembly 10, oxygen ions ($O^{2-}$) generated at the cathode layer 16 are transported across the electrolyte 18 interposed between the anode layer 14 and the cathode layer 16. The reducing gas 24, for example hydrogen, is fed to the anode layer 14. The reducing gas 24 at the anode layer 14 reacts with oxygen ions ($O^{2-}$) transported to the anode layer 14 across the electrolyte 18. The oxygen ions ($O^{2-}$) combine with hydrogen to form water and release electrons into an external electric circuit (not shown). The reaction rate of hydrogen with oxygen ions is therefore directly proportional to the current. In the case of an open circuit (no current) there is no reaction and the voltage across the electrodes remains at a maximum level.

The anode layer 14 provides reaction sites for an electrochemical oxidation of the reducing gas 24 introduced into the solid oxide electrochemical device 12. In addition, the anode layer 14 material should be stable in the reducing gas 24 reducing environment, have adequate electronic conductivity, surface area and catalytic activity for the reducing gas reaction at the solid oxide electrochemical device operating conditions, and have sufficient porosity to allow fuel gas transport to the reaction sites. The reducing gas is generally introduced through a gas manifold. The anode layer 14 can comprise a number of materials having these properties, including, noble metals, transition metals, cermets, ceramics, and combinations thereof. More specifically, the anode layer 14 may be made of any suitable material, such as Nickel (Ni), Ni Alloy, Ag, Cu, Cobalt, Ruthenium, Ni—YSZ cermet, Cu—YSZ cermet, Ni-Ceria cermet, or combinations thereof, for example.

The cathode layer 16 provides reaction sites for the electrochemical reduction of oxygen to generate oxygen ions that carry current through the electrolyte 18. Accordingly, the cathode layer 16 is stable in the oxidizing environment, has sufficient electronic and ionic conductivity, surface area and catalytic activity for the oxidant reaction at the solid oxide electrochemical device 12 operating conditions and has sufficient porosity to allow gas transport to the reaction sites. The cathode layer 16 can be made of a number of materials having these properties, including an electrically conductive oxide, perovskite, $La_{1-x}Sr_xMnO_3$ (LSM), doped $LaMnO_3$, tin doped Indium Oxide ($In_2O_3$), Strontium-doped $PrMnO_3$, La ferrites, La cobaltites, $RuO_2$—YSZ, and combinations thereof, for example.

In some embodiments, the anode interconnect 20 and the cathode interconnect 26 may be combined to act as a bipolar element, where the cathode layer side of the bipolar element, having the cathode layer side adjacent to the cathode layer 16 of one of the solid oxide electrochemical device assembly 10, acts as a cathode interconnect 26. The anode layer side of the bipolar element, where anode layer side is adjacent to the anode layer 14 of the next solid oxide electrochemical device assembly 10, acts as an anode interconnect 20. Moreover, the bipolar element further acts as the passage for the oxidant for the cathode layer 16 and the passage for the reducing gas 24 for the anode layer 14 in the solid oxide electrochemical device assembly 10.

In another embodiment, a reverse configuration can be employed, where the first electrode 14 is the cathode layer and the second electrode 16 is the anode layer. Accordingly, the first interconnect 20 is a cathode interconnect and the second interconnect 26 is the anode interconnect.

An anode bonding agent 32 provides a conducting medium between the anode layer 14 and the anode interconnect 20. Suitable materials for use as the anode bonding agent 32 include, for example, nickel oxide paste, nickel paste, platinum paste, and metal or metal oxide powders such as silver, nickel, gold, or platinum dispersed in organic binders. The anode interconnect 20 is sealed to the anode layer 14 around the perimeter of the anode layer using an anode sealing agent 34. Because the anode bonding agent 32 is typically porous and conductive, the anode sealing agent 34 is used to seal the anode layer 14 to the anode interconnect 20 and seal the edge around the anode bonding agent. Suitable materials for use as anode sealing agent 34 include glasses, such as soda lime glass, boron silicate glass, or zirconium doped glass, glass-ceramics, nickel oxide pastes, nickel pastes, or seal tapes formed by tapecasting or rolling organic fibers and binders added to glass or glass ceramic powders, for example. In particular embodiments, the coefficient of thermal expansion of the anode sealing agent 34 is matched to the coefficients of thermal expansion of the anode layer 14 and the anode interconnect 20. Other materials that provide similar functionality may, of course, be used for the anode bonding agent 32 and the anode sealing agent 34.

The solid oxide electrochemical device assembly 10 also includes a spacer material 36 disposed between the cathode layer 16 and the cathode interconnect 26. The spacer material 36 can comprise a compliant material which allows mechanical force to be transmitted axially to the anode bonding agent 32 as well as the perimeter of the anode sealing agent 34 through the solid oxide electrochemical device assembly 10 during the presealing process, which will be described in further detail below. The spacer material 36 may or may not conduct electric current between the cathode layer 16 and the cathode interconnect 26. The spacer material 36 may comprise a heat resistant compliant felt or paper, such as zirconium felt, alumina felt, or FiberFrax® felt (a vitreous aluminosilicate fiber from Unifrax Corporation, Niagara Falls, N.Y.).

The spacer material 36 disposed between the cathode layer 16 and the cathode interconnect 26 results in a solid oxide electrochemical device assembly 10 which is functionally a pseudostack, as only some of the interconnections and seals to be included in the final operable solid oxide electrochemical device assembly are formed. In solid oxide electrochemical device assembly 10, only the anode layer 14 and the anode interconnect 20 will bonded and sealed to each other during the presealing process.

Figure 2:
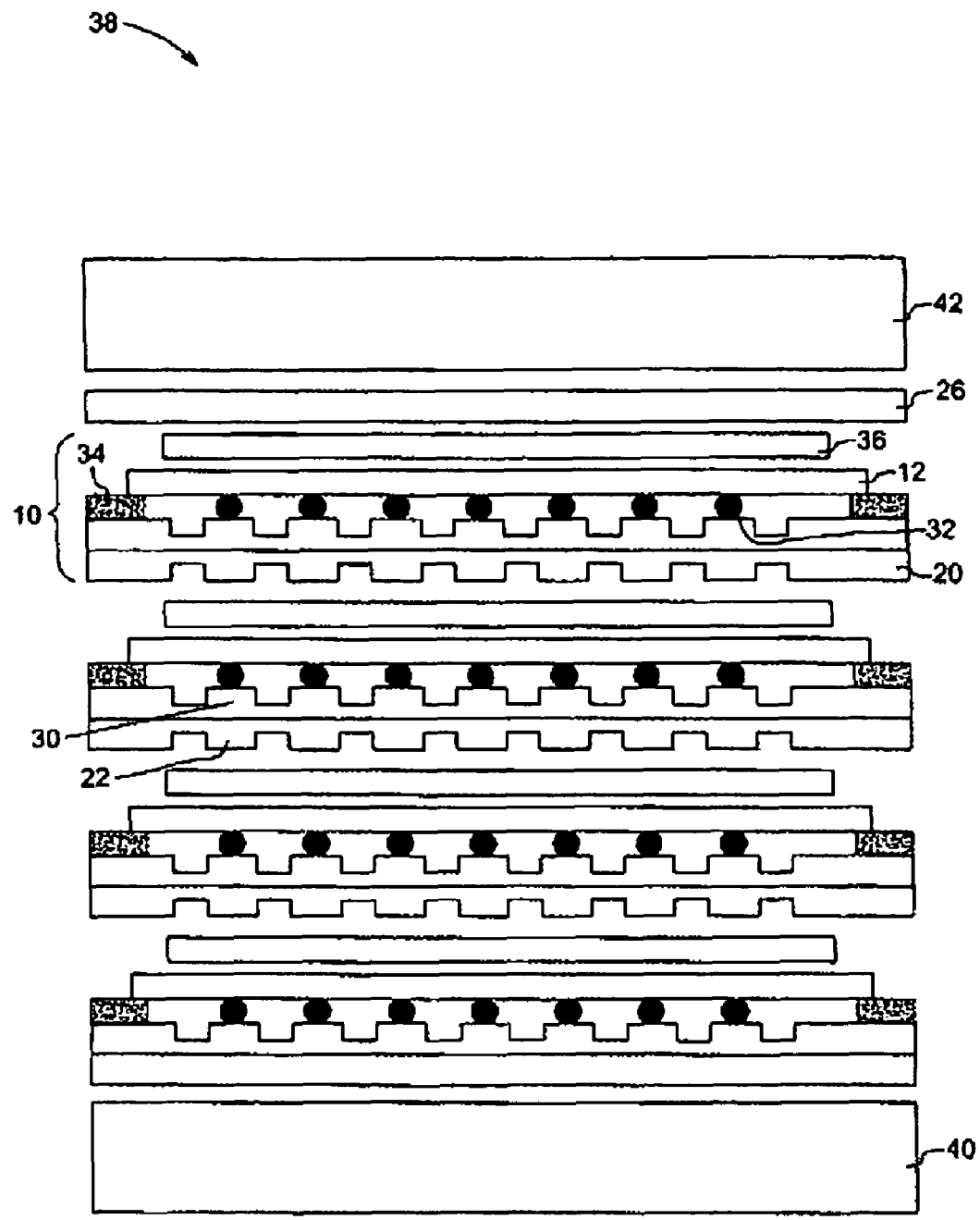
FIG. 2 is a schematic illustration of a solid oxide electrochemical device pseudostack comprising multiple solid oxide electrochemical device assemblies made in accordance with an embodiment of the present invention.

FIG. 2 illustrates a solid oxide electrochemical device pseudostack 38 comprising multiple solid oxide electrochemical device assemblies 10 made in accordance with an embodiment of the present invention.

Each solid oxide electrochemical device assembly 10 is disposed in such a way that the cathode layer 16 is directly exposed to the flow channels 30 for flow of oxidant to the cathode layer 16, and anode layer 14 is directly exposed to the reducing gas 24 flowing in the flow channels 22.

The solid oxide electrochemical device pseudostack 38 also includes a base plate 40 during the presealing process. Also, a weight 42 may be placed on top of the solid oxide electrochemical device pseudostack 38 to provide a compressive force to the solid oxide electrochemical device pseudostack for sealing. After the solid oxide electrochemical device pseudostack 38 is formed, the base plate 40 and the weight 42 are dismantled from the solid oxide electrochemical device pseudostack. The compressive force for sealing and bonding may, of course, be applied through other means such as bolts, hydraulic or pneumatic actuators, and so forth.

In an alternate embodiment, the interconnections for pseudostack may be initially made only on the cathode side of each solid oxide electrochemical device, followed by sealing and/or bonding of the anode layer in the final assembly process.

In another embodiment, the cathode layer 16 does not cover the entire surface of the solid oxide electrochemical device 12, the electrolyte 18 is exposed, and the cathode layer side seal may be made between the cathode interconnect 30 and the electrolyte 18.

In the embodiment illustrated in FIG. 2, the anode layers 14 are bonded and sealed to the anode interconnects 20. However, there is no permanent connection on the cathode sides during the presealing process that produces the pseudostack. This presealing process permits disassembly of the solid oxide electrochemical devices from one another for testing and replacement of or reworking of any defective devices prior to final assembly, interconnection and sealing.

For example, a number of non-destructive tests and inspections can be performed on the solid oxide electrochemical devices before the solid oxide electrochemical device stack is finally assembled. In some embodiments, the testing and inspection includes performing a leak test, a resistance measurement test, an impedance measurement test, a mechanical integrity test, an ultrasound test, a X-ray test, measurement of open circuit voltage, an impedance spectroscopy or an electrochemical performance test. Additionally, the solid oxide electrochemical devices can be tested or inspected for cracks, low performance, defective interconnect contacts, dislocations, abnormal colors, or flow channel blockage. In commercial production of some embodiments, some or all of these tests may be performed, and these may be supplemented by other tests and inspections, where desired. The final assembly can then be made only with known good solid oxide electrochemical device assemblies. As a result of the presealing process, significant improvement productivity, processing, and reliability in the formation of the solid oxide electrochemical device stack is achieved.

In some embodiments, when individual solid oxide electrochemical device assemblies are formed, they may be individually tested and inspected for defects prior to assembly to form the solid oxide electrochemical device stack. However, as will be appreciated by those skilled in the art, one advantage of forming the pseudostack prior to testing and inspecting allows the use of a single manifold for providing a fuel gas or oxidant to the plurality of flow channels in the pseudostack if desired.

Figure 3:
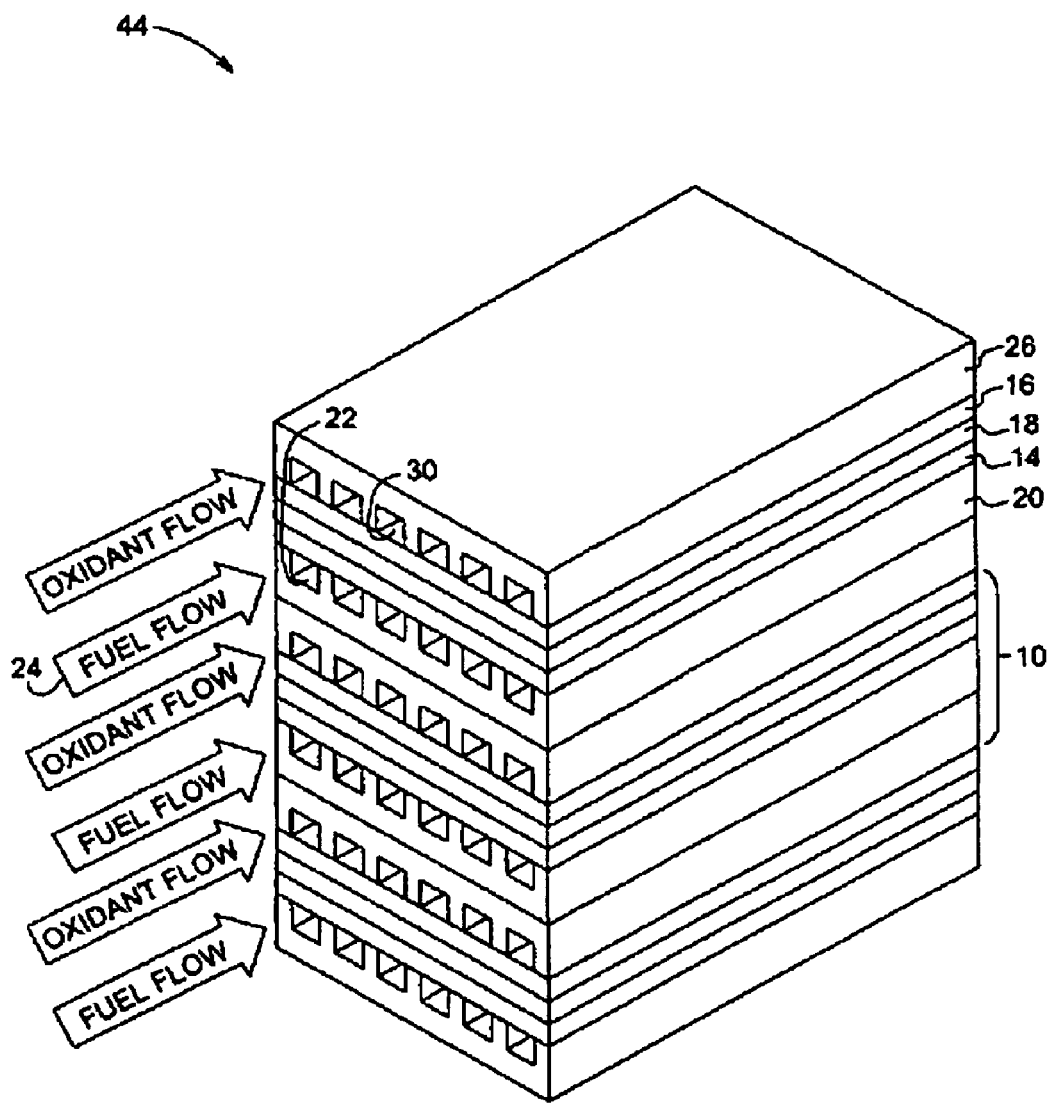
FIG. 3 is a schematic illustration of a solid oxide electrochemical device stack made in accordance with an embodiment of the present invention.

FIG. 3 illustrates a solid oxide electrochemical device stack made in accordance with an embodiment of the present invention. After the non-destructive tests and inspections are carried out for the individual solid oxide electrochemical device assemblies 10, multiple solid oxide electrochemical device assemblies 10 are stacked together to form the assembled solid oxide electrochemical device stack 44. In some embodiments, the spacer material 36 is removed after the disassembly of the pseudostack and prior to the formation of the solid oxide electrochemical device stack 44. During the formation of the assembled solid oxide electrochemical device stack 44, the electrode (either the anode layer to the cathode layer) that was not firmly connected to its corresponding interconnect (the anode interconnect or the cathode interconnect) during the assembly of the pseudostack may be connected using a bonding agent. For example, the cathode layer 16 can be bonded to the cathode interconnect 30 using the cathode bonding agent such as lanthanum strontium manganate (LSM) paste, doped lanthanum ferrite paste, doped lanthanum cobaltite paste or other electronic conductive pastes suitable to high temperature oxidizing environments.

Figure 4:
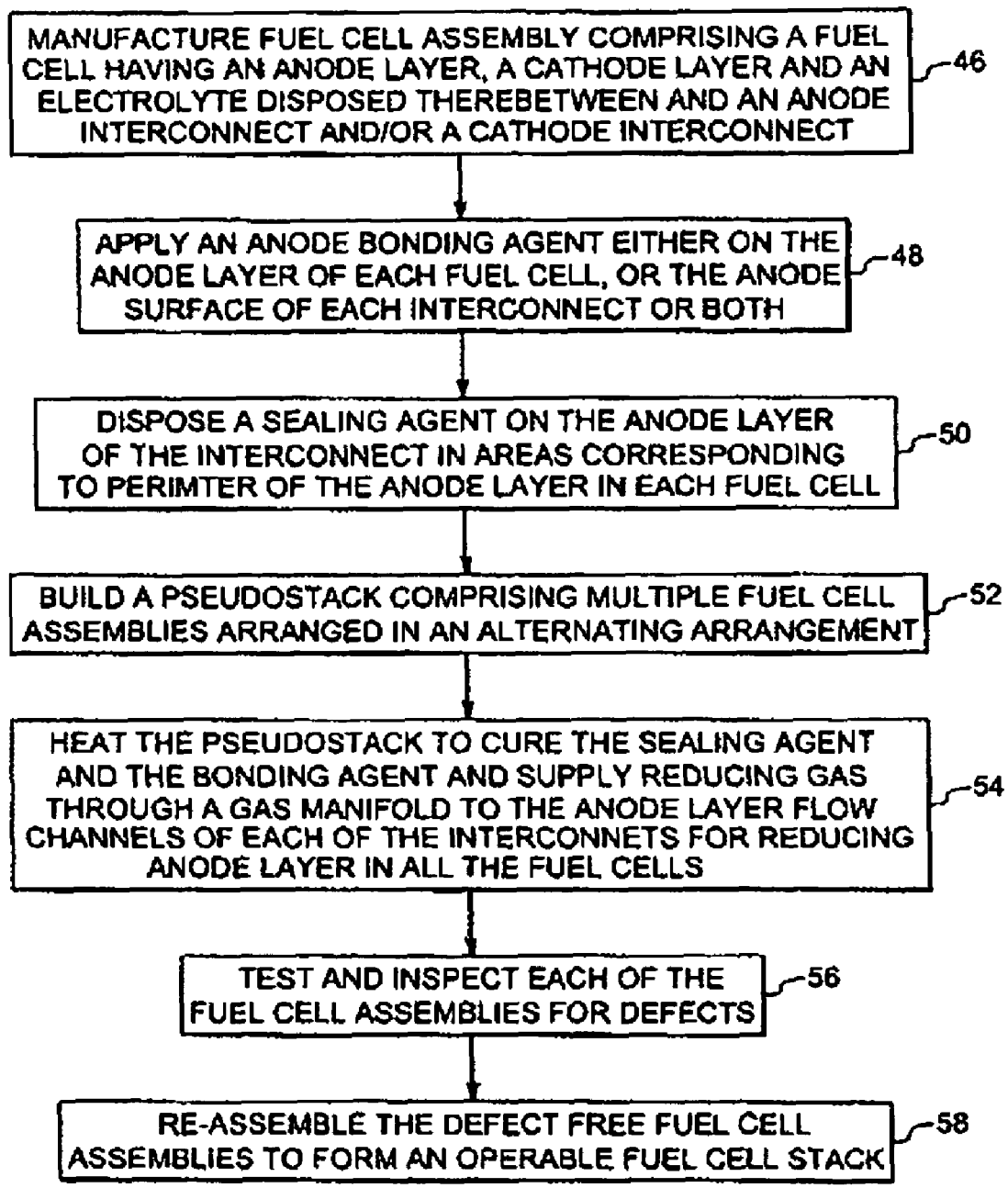
FIG. 4 is a flow diagram illustrating an method of manufacturing the solid oxide electrochemical device, in accordance with an embodiment of the present invention.

FIG. 4 is a flow diagram illustrating a method of manufacturing the solid oxide electrochemical device in accordance with as an embodiment of the present invention. More particularly, the solid oxide electrochemical device is a SOFC, but it should be understood that this invention also encompasses methods for manufacturing solid oxide electrolyzers. The method comprises manufacturing the solid oxide electrochemical device assembly comprising the solid oxide electrochemical device, which includes the anode layer, the cathode layer and the electrolyte disposed therebetween and the anode interconnect and/or the cathode interconnect as indicated by step 46. The method also comprises applying an anode bonding agent between the anode and an anode interconnect on either the anode layer, the anode side of the anode interconnect, or both so that the anode bonding agent is in contact with the anode and the anode interconnect (step 48). At step 50, an anode sealing agent is applied between the anode and the anode interconnect. In an alternate embodiment, a sealing agent and a cathode bonding agent may be applied between one cathode interconnect and the cathode layer of the solid oxide electrochemical device.

At step 52, the pseudostack is manufactured using multiple solid oxide electrochemical device assemblies arranged in an alternating arrangement. A spacer material is placed on the cathode layer surface of each solid oxide electrochemical device prior to placing the next interconnect (anode interconnect or cathode interconnect) over it. Thus, in this embodiment, the cathode layer is left unsealed. The cathode layer may or may not be bonded or sealed upon final assembly to form the solid oxide electrochemical device stack. In an alternate embodiment, the cathode layer may be bonded or sealed in the pseudostack, while the anode layer is left unbonded or unsealed.

The method further comprises heating the cathode interconnect, the spacer material, the cathode, electrolyte, the anode, the anode interconnect, the anode bonding agent, and the anode sealing agent to a curing temperature and maintaining the curing temperature for a curing time. The curing temperature and curing time should be effective to bond and seal the anode to the anode interconnect in step 54. The cure temperature and cure time will be dependent on the sealing agent used.

For example, the heating step may comprise heating the cathode interconnect, the spacer material, the cathode, electrolyte, the anode, the anode interconnect, the anode bonding agent, and the anode sealing agent to the curing temperature at a rate ranging from 0.1° C. per minute and 10° C. per minute. More particularly, the heating step may comprise heating the cathode interconnect, the spacer material, the cathode, electrolyte, the anode, the anode interconnect, the anode bonding agent, and the anode sealing agent to the curing temperature at a rate ranging from 0.5° C. per minute to 3° C. per minute. Still more particularly, the heating step may comprise heating the cathode interconnect, the spacer material, the cathode, electrolyte, the anode, the anode interconnect, the anode bonding agent, and the anode sealing agent to the curing temperature at a rate ranging from 1° C. per minute to 1.5° C. per minute. In addition, the curing temperature may range from about 600° C. to about 1000° C. The curing time may range from about 1 minute to about 4 hours, and more particularly, the curing time may range from about 45 minute to about 1.5 hours.

Furthermore, the heating step may comprise heating the cathode interconnect, the spacer material, the cathode, electrolyte, the anode, the anode interconnect, the anode bonding agent, and the anode sealing agent to at least one intermediate temperature for at least one intermediate length of time and then heating the cathode interconnect, the spacer material, the cathode, electrolyte, the anode, the anode interconnect, the anode bonding agent, and the anode sealing agent to the curing temperature, wherein the intermediate temperature is less than or the curing temperature. The heating of the components to at least one intermediate temperature for an intermediate time allows for uniform temperature distribution of the components, which reduces thermal cycling stresses.

For example, a first intermediate temperature may range from about 40° C. to about 150° C. More particularly, the first intermediate temperature ranges from about 100° C. to about 150° C. A second intermediate temperature may range from about 200° C. to about 500° C. More particularly, the second intermediate temperature ranges from about 375° C. to about 425° C. A third intermediate temperature may range from about 550° C. to about 650° C. More particularly, the third intermediate temperature may range from about 625° C. to about 675° C.

The intermediate length of time at which the intermediate temperatures are maintained may range from about 30 minutes to about 48 hours. More particularly, the intermediate length of time ranges from about 2 hours to about 5 hours.

The preparation of certain anode materials can comprise chemical reduction. For example, the solid oxide electrochemical device may be constructed with the anode layer containing nickel oxide, which is stable in air. Prior to operation of the solid oxide electrochemical device stack, the nickel oxide is reduced to nickel. The anode layer may undergo dimensional changes as well as changes in thermal expansion properties during the reduction process. If the solid oxide electrochemical device is sealed to the anode interconnect or the cathode interconnect during the reduction process, these dimensional changes in the constrained solid oxide electrochemical device may cause failure of the solid oxide electrochemical device or the sealing. Therefore, the present invention also improves reliability of the individual solid oxide electrochemical devices, and thereby of solid oxide electrochemical device assemblies and solid oxide electrochemical device stacks, by reducing the anode layer either prior to formation of the seal between the anode layer and the anode interconnect, or during the sealing process. Accordingly, the anode layer in each of the solid oxide electrochemical device assemblies does not undergo further chemical reduction during operation of solid oxide electrochemical device stack.

Multiple anode layers may be reduced simultaneously, as in the pseudostack. Gases used to reduce the anode layer may include hydrogen, methane, natural gas, carbon monoxide or any other suitable gas capable of producing the desired reduction reaction. For example, a 10% by volume carbon monoxide, 10% by volume water vapor, and 80% by volume inert gas, such as nitrogen or argon, gas mixture can be introduced to reduce the anode layers. In another example, a 90% by volume hydrogen and 10% by volume water vapor mixture can be used to reduce the anode layers. The addition of water vapor prevents carbon buildup on a nickel anode when carbon containing gases are used to reduce the anode. In embodiments where the anode comprises nickel oxide, the temperature at which the reducing agent is introduced can be between 500° C. and 1100° C.

Thus, in some embodiments, at step 54, a reducing gas is supplied through a gas manifold to the flow channels of the anode layer in all the solid oxide electrochemical device assemblies for reducing the anode layer. The introduction of the gas containing a reducing agent to the fuel flowfields may occur before heating to the cure temperature or substantially simultaneous to heating to the cure temperature. The reducing agent can be present in the gas in an amount of 5% by volume of the gas to 100% by volume of the gas. In addition, the gas may be introduced at a rate ranging from about 0.0002 standard liters per minute per square centimeter of area of the anode to about 1 standard liter per minute per square centimeter of area of the anode. More particularly, the gas may be introduced at a rate ranging from about 0.001 standard liters per minute per square centimeter of area of the anode to about 0.5 standard liter per minute per square centimeter of area of the anode. Still more particularly, the gas may be introduced at a rate ranging from 0.04 standard liters per minute per square centimeter of area of the anode to about 0.2 standard liters per minute per square centimeter of area of the anode.

In step 56, the individual solid oxide electrochemical device assemblies in the pseudostack may be tested and inspected for defects. At step 58, the defect free solid oxide electrochemical device assemblies are selected from the individual solid oxide electrochemical device assemblies and the defective assemblies are replaced to form an operable solid oxide electrochemical device stack. The final assembly process includes completing any interconnects and seals that were not made in formation of the pseudostack. In some embodiments, the spacer material is removed before sealing the cathode and the cathode interconnect. In other embodiments, the cathode is bonded to the cathode interconnect prior to or substantially simultaneous to sealing the cathode and the cathode interconnect.

In other embodiments, a gas containing an oxidizing agent can be introduced to the fuel flowfields before heating to the cure temperature or substantially simultaneous to heating to the cure temperature. The oxidizing agent reacts with any organic material in the anode, the anode bonding agent, the anode sealing agent, or the anode interconnect in a carbonization reaction to burn-off the organic material. Additionally, heating the components to an intermediate temperature for an intermediate length of time also allows for complete organic burn-off. The oxidizing agent can comprise oxygen or water vapor, for example. For instance, air or a non-combustible gas, such as nitrogen, containing 20% water vapor by volume can be introduced to burn-off the organic material.

In yet another embodiment, the components of the pseudostack may be cooled after being heated to a curing temperature. The cooling may be at a rate ranging from about 0.1° C. per minute to about 10° C. per minute. More particularly, the cooling may be at a rate ranging from about 0.5° C. per minute to about 1.5° C. per minute. The cooling of the pseudostack at this slow rate allows any stresses to be released. During the cooling of the pseudostack, a gas containing a reducing agent can be fed into the fuel flowfields. The gas may be introduced at a rate ranging from about 0.0002 standard liters per minute per square centimeter of area of the anode to about 0.1 standard liter per minute per square centimeter of area of the anode. More particularly, the gas may be introduced at a rate ranging from 0.001 standard liters per minute per square centimeter of area of the anode to about 0.040 standard liters per minute per square centimeter of area of the anode.

In alternate embodiments, the defect free solid oxide electrochemical device stack may be obtained without the formation of the pseudostack. In the present implementation, the solid oxide electrochemical device assembly is formed as explained previously. However, each solid oxide electrochemical device assembly may be reduced by the passage of the reducing gas to form the reduced solid oxide electrochemical device assembly for testing and inspection. Two or more of the defect free reduced solid oxide electrochemical device assemblies may be stacked to form the defect free solid oxide electrochemical device stack.

As will be appreciated by those skilled in the art, the overall system offered by the present technique enables a variety of benefits over conventional solid oxide electrochemical devices and their fabrication methods. In the present implementation, the anode layer 14 of the solid oxide electrochemical device assemblies 10 is reduced in volume prior to the final assembly and operation of the solid oxide electrochemical device 12 and concurrently with the hardening of sealing agent 34. This prevents damage of the solid oxide electrochemical device 12 or the sealing agent 34 due to the reduction in volume of the anode layer 14 while the solid oxide electrochemical device 12 is mechanically constrained by the hardened seal 34. In addition, the present technique also helps to perform certain tests and inspection of the solid oxide electrochemical device assemblies 10 before the final assembly of the solid oxide electrochemical device stack 38. The present process helps in eliminating the defective solid oxide electrochemical device assemblies 10 before the final assembly of the solid oxide electrochemical device stack, instead of eliminating the complete solid oxide electrochemical device stack in the event any solid oxide electrochemical device assembly is found to be defective.

The present invention is further illustrated below in an example which is not to be construed in any way as imposing limitations upon the scope of the invention. On the contrary, it is to be clearly understood that resort may be had to various other embodiments, modifications, and equivalents thereof which, after reading the description therein, may suggest themselves to those skilled in the art without departing from the scope of the invention and the appended claims.

EXAMPLE 1

In a particular embodiment of the present invention, a ceramic solid oxide electrochemical device comprising an electrolyte disposed between an anode and a cathode was placed between an anode interconnect and a cathode interconnect. A NiO bonding agent was applied to the anode interconnect. In addition, a 15 mil thick $BaO$—$SiO_2$—$MgO$—$CaO$ based glass seal tape was placed on the seal margin of the anode interconnect. A compliant ceramic felt comprising FiberFrax from Unifrax Company was placed between the cathode and the cathode interconnect. Five such solid oxide electrochemical device assemblies were stacked together and a 30 pound dead weight is placed on the top-most interconnect to make sure all layers are intimately contacted.

This solid oxide electrochemical device pseudostack was placed in a furnace and heated using the following heating schedule. In addition, air was introduced into the anode flowfields as an oxidizing agent to burn-off any organic material. Subsequently, a hydrogen and nitrogen gas mixture was also introduced into the anode flowfields at various composition to reduce the anode. In addition, air was introduced to the cathode flow fields. The gases were introduced to the anode and cathode flowfields at a rate of 0.5 standard liters per minute (SLPM) per cell for stack sizes up to 10 cells and 0.7 SLPM to 0.8 SLPM per cell for stack sizes up 11 to 15 cells. The introduction of gases was stopped when the temperature reached 100° C. after the furnace was turned off.

TABLE 1

Heating Schedule for Presealing a Solid Oxide Electrochemical Device Pseudostack

| Ramp Rate (° C./hr) | Set Point (° C.) | Intermediate Time (hr) | Anode gas (SLPM)/cell | Cathode gas (SLPM)/cell |
|---|---|---|---|---|
| 90 | 150 | 3 | Air: 0.5 | Air: 0.5 |
| 90 | 400 | 1-2 | Air: 0.5 | Air: 0.5 |
| 90 | 650 | 1-2 | Air: 0.5 | Air: 0.5 |
|  | 650 | 0.1 | $N_2$: 0.5 | Air: 0.5 |
|  | 650 | 0.1 | 10% $H_2$: 0.5 | Air: 0.5 |
| 90 | 900 | 0.5 | 10% $H_2$: 0.5 | Air: 0.5 |
| 90 | 870 | 0.5 | 25% $H_2$: 0.5 | Air: 0.5 |
|  | 870 | 0.5 | 50% $H_2$: 0.5 | Air: 0.5 |
|  | 870 | 1 | 64% $H_2$: 0.5 | Air: 0.5 |
| 90 | 800 | 1 | 64% $H_2$: 0.5 | Air: 0.5 |
| 90 | 500 | 1 | 25% $H_2$: 0.5 | Air: 0.5 |
| Furnace off |  |  | 3.5% $H_2$: 0.5 | Air: 2.5 |
|  | 100 |  | 0 | 0 |

The presealed solid oxide electrochemical device assemblies were visually inspected. In addition, leakage and pressure drop measurements were preformed on the anode sides. Visually, the seals were noted to be good. In addition, the pressure decay measurement showed that each assembly was gas tight and the anode-side pressure drop was narrowly distributed.

It should be understood that the foregoing relates to particular embodiments of the present invention, and that numerous changes may be made therein without departing from the scope of the invention as defined from the following claims.

What is claimed is:

1. A method for manufacturing a solid oxide electrochemical device comprising,
    disposing electrolyte between a first electrode and a second electrode;
    applying a bonding agent between the first electrode and a first interconnect so that the bonding agent is in contact with the first electrode and the first interconnect, wherein the first electrode and the first interconnect are configured to form at least one flowfield between each other;
    applying a sealing agent between the first electrode and the first interconnect;
    disposing a second interconnect adjacent to the second electrode;
    disposing a removable spacer material between the second electrode and the second interconnect, thereby creating an unbonded separation between the second electrode and the second interconnect; and
    heating the first interconnect, the first electrode, the electrolyte, the second electrode, the second interconnect, the bonding agent, the sealing agent, and the spacer to at least one intermediate temperature for at least one intermediate length of time, and then to a curing temperature, for a curing time, effective to bond and seal the first electrode to the first interconnect, wherein the at least one intermediate temperature is less than the curing temperature.

2. The method of claim 1, wherein the first electrode comprises an anode, the first interconnect comprises an anode interconnect, the second electrode comprises a cathode, and the second interconnect comprises a cathode interconnect.

3. The method of claim 1, wherein the first electrode comprises a cathode, the first interconnect comprises a cathode interconnect, the second electrode comprises an anode, and the second interconnect comprises an anode interconnect.

4. The method of claim 1, further comprising examining the first interconnect, the first electrode, the electrolyte, the second electrode, the second interconnect, the bonding agent, and the sealing agent, after the heating step, for defects.

5. The method of claim 4, further comprising replacing any one or more components after the examining step.

6. The method of claim 1, wherein the heating step comprises heating the first interconnect, the first electrode, the electrolyte, the second electrode, the second interconnect, the bonding agent, the sealing agent, and the spacer material at a rate ranging from 0.1° C. per minute to 10° C. per minute.

7. The method of claim 1, wherein the heating step comprises heating the first interconnect, the first electrode, the electrolyte, the second electrode, the second interconnect, the bonding agent, the sealing agent, and the spacer at a rate ranging from 0.5° C. per minute to 3° C. per minute.

8. The method of claim 1, wherein the curing temperature ranges from about 600° C. to about 1000° C.

9. The method of claim 1, wherein the curing time ranges from about 1 minute to about 4 hours.

10. The method of claim 1, wherein the at least one intermediate temperature ranges from about 40° C. to about 150° C.

11. The method of claim 1, wherein the at least one intermediate temperature ranges from about 200° C. to about 500° C.

12. The method of claim 1, wherein the at least one intermediate temperature ranges from about 550° C. to about 650° C.

13. The method of claim 1, wherein the at least one intermediate length of time ranges from about 30 minutes to about 48 hours.

14. The method of claim 1, further comprising introducing a gas containing a reducing agent to the at least one flowfield before the heating to the cure temperature or substantially simultaneous to the heating to the cure temperature, wherein the reducing agent reduces oxide in the first electrode.

15. The method of claim 14, wherein the gas is introduced at a rate ranging from about 0.0002 standard liters per minute per square centimeter of area of the first electrode to about 1 standard liter per minute per square centimeter of area of the first electrode.

16. The method of claim 1, further comprising introducing a gas containing an oxidizing agent to the at least one flowfield before the heating to the cure temperature, wherein the oxidizing agent reacts with any organic material in the first electrode, the bonding agent, the sealing agent, or the first interconnect in a carbonization reaction to burn-off the organic material.

17. The method of claim 4, further comprising cooling the first interconnect, the first electrode, the electrolyte, the second electrode, the second interconnect, the bonding agent, the sealing agent, and the spacer material after the heating step and before the examining step.

18. The method of claim 17, where the cooling comprises cooling the first interconnect, the first electrode, the electrolyte, the second electrode, the second interconnect, the bonding agent, the sealing agent, and the spacer material at a rate ranging from about 0.1° C. per minute to about 10° C. per minute.

19. A solid oxide electrochemical device manufactured by the method of claim 1.

20. The method of claim 1, wherein the spacer material comprises a heat resistant compliant felt or a heat resistant compliant paper.

* * * * *